United States Patent
Wegener et al.

(10) Patent No.: US 7,770,390 B2
(45) Date of Patent: Aug. 10, 2010

(54) CONFIGURATIONS AND METHODS FOR WAVE ENERGY EXTRACTION

(76) Inventors: Paul T. Wegener, 73 W. 47th St., Unit 3, New York, NY (US) 10038; John Berg, 415 Ward Dr., Oak Hill, FL (US) 32759

( * ) Notice: Subject to any disclaimer, the term of this patent is extended or adjusted under 35 U.S.C. 154(b) by 604 days.

(21) Appl. No.: 10/599,282

(22) PCT Filed: Mar. 21, 2005

(86) PCT No.: PCT/US2005/009338
§ 371 (c)(1),
(2), (4) Date: Sep. 25, 2006

(87) PCT Pub. No.: WO2005/094450
PCT Pub. Date: Oct. 13, 2005

(65) Prior Publication Data
US 2008/0238102 A1    Oct. 2, 2008

Related U.S. Application Data

(60) Provisional application No. 60/556,713, filed on Mar. 25, 2004.

(51) Int. Cl.
F03B 13/18 (2006.01)
F03B 17/02 (2006.01)
F03B 13/10 (2006.01)
F03B 13/12 (2006.01)

(52) U.S. Cl. ............... 60/497; 60/495; 60/499; 290/42; 290/43; 290/53; 290/54

(58) Field of Classification Search .......... 60/398, 60/495–507; 290/42, 53; 417/330–333, 417/337
See application file for complete search history.

(56) References Cited

U.S. PATENT DOCUMENTS

| | | | | |
|---|---|---|---|---|
| 4,179,886 A * | 12/1979 | Tsubota | ........... | 60/398 |
| 4,208,876 A * | 6/1980 | Tsubota | ........... | 60/495 |
| 4,352,023 A | 9/1982 | Sachs et al. | | |
| 4,447,740 A * | 5/1984 | Heck | ........... | 290/53 |
| 4,598,547 A * | 7/1986 | Danihel | ........... | 60/507 |
| 5,411,377 A * | 5/1995 | Houser et al. | ........... | 417/333 |
| 5,514,023 A * | 5/1996 | Warner | ........... | 473/594 |
| 6,644,027 B1 * | 11/2003 | Kelly | ........... | 60/498 |
| 6,731,018 B1 * | 5/2004 | Grinsted et al. | ........... | 290/42 |
| 6,756,695 B2 * | 6/2004 | Hibbs et al. | ........... | 290/42 |

FOREIGN PATENT DOCUMENTS

WO    87/04401    7/1987

* cited by examiner

Primary Examiner—Thomas E Denion
Assistant Examiner—Christopher Jetton
(74) Attorney, Agent, or Firm—Fish & Associates, PC

(57) ABSTRACT

A wave energy harvester (100A) includes an element (120A) that converts forward and/or backward of water in a wave (102A, B, C) passing the harvester (100A) into upward and/or downward movement to thereby increase the vertical amplitude of the harvester (100A) relative to the sea floor (104A, B, C). In most preferred aspects, the element (120A) is a hydrofoil that is coupled to the harvester (100A). Further preferred aspects include those in which part of, or the entire harvester (100A) has a neutral buoyancy, and where energy is extracted from the downwards movement of the neutrally buoyant part (100A) after a wave has lifted that part (110A).

16 Claims, 2 Drawing Sheets

CONFIGURATIONS AND METHODS FOR WAVE ENERGY EXTRACTION

The application claims priority to our copending U.S. provisional patent application with the Ser. No. 60/556,713, filed Mar. 25, 2004, which is incorporated by reference herein.

FIELD OF THE INVENTION

The field of the invention is energy generation using wave energy.

BACKGROUND OF THE INVENTION

Ocean waves have been regarded as a potential source for energy extraction for over 200 years and many devices have been constructed to that end. However, all or almost all of the currently known devices fail to extract sufficient energy in an economic manner.

For example, many wave energy harvesters utilize alternating peaks and troughs of ocean waves to raise and lower part of the harvester to thereby extract mechanical energy from relative motions of at least two portions of the device. Motion of one portion of such devices is typically due to flotation on the rising and falling water surface as a wave passes the device which is in a relatively fixed position. Since the quantity of energy harvested is directly proportional to the weight of the device on the down stroke, or the buoyancy force on the upstroke, most known devices lag the wave. Typically, such devices sink as the water rises until relative buoyancy increases sufficiently to force the device upwards, and then emerge onto or above the water surface as the wave falls, since the downward stroke is used to extract energy from the device. As such devices are based on buoyant forces generated by the up-and-down motion of the wave, they are also known as point-absorbers.

For point absorbers which use buoyancy as the predominant actuating force, a float or other buoyant portion is tethered to a structure below the surface and the upward pull on the tether transmits the force that is harvested as energy. In some of these devices, the buoyant floats are attached to a fixed point via a flexible tether, and therefore are subject to tilting of the float upon forward force impingement of a wave. Moreover, due to the often V-shaped cross-section of the buoyant floats, the floats will typically submerge further than a comparably sized flat float.

In other known waver energy generators, the forward momentum of a wave is used exclusively. Such devices are commonly known as oscillating water column devices, in which the wave rushing into a cavity pushes air out of the cavity through a turbine. Alternatively, such devices allow a wave crest to rush into a cavity that is hydraulically coupled to one or more turbine. An exemplary device is described at the web address http://www.waveplane.com. Depending on the location, the forward momentum of a wave is substantial, and most clearly evidenced in breaking waves or waves used by surfers. While such wave energy harvesters are often mechanically more simple, various disadvantages remain. Among other things, only a portion of the wave energy is translated into harvested energy, and potentially usable energy from the up-and-down motion of the wave are typically lost.

In further known wave energy harvesters, hydrofoils are employed to transform at least part of the energy of a wave in a forward motion as described in WO 87/04401 to Cook, or U.S. Pat. Nos. 4,352,023 and 4,598,547 to Sachs et al and Danihel, respectively. While such devices achieve at least some advantage in their implementation, various disadvantages remain. Among other things, the force provided by the hydrofoils is typically used to align the wave energy system perpendicular to the wave, or to reduce water resistance, but not employed to generate energy.

Therefore, although numerous wave energy harvesters are known in the art, all or almost all of them suffer from one or more disadvantages. Consequently, there is still a need to provide improved configurations and devices for wave energy extraction.

SUMMARY OF THE INVENTION

The present invention is directed towards configurations and methods of wave energy harvesters that include an element that translate forward velocity of water of a wave relative to the element into an upward force of the element to additively increase usable kinetic and/or potential energy.

In one aspect of the inventive subject matter, a wave energy harvester has an at least partially submersed amplifier element (preferably having neutral buoyancy), wherein the element is functionally coupled to a preferably electrical generator such that movement of the element actuates the generator, and wherein the amplifier element has a shape (e.g., hydrofoil shape or hull) effective to translate forward velocity of water of a wave relative to the element into an upward force of the element. It is typically preferred that the harvester is coupled to a structure that retains the harvester in a laterally fixed position relative to the sea floor and that allows vertical movement of the amplifier element relative to the sea floor.

In another aspect of the inventive subject matter, a wave energy harvester comprising a hydrofoil element that produces a bi-directional force from a horizontal motion of water of a wave, wherein the bi-directional force is directed upwards as the wave approaches a peak and directed downwards as the wave approaches a trough. Most preferably, the hydrofoil element is completely submersed and optionally coupled to a buoyant element that is at least partially submersed. A generator in such devices is configured such that it is actuated at least part by the bi-directional force. Where desirable, a structure may be provided that retains the harvester in a fixed relationship to a sea floor, and that further restricts movement of the hydrofoil element to substantially vertical movement.

Therefore, viewed from another perspective, the inventors contemplate a floating device that includes a hydrofoil, which is configured to reduce or amplify a buoyant force of a wave passing the device. A frame may be included to which the hydrofoil is coupled, wherein the frame is configured to allow change of the pitch angle of the hydrofoil relative to the wave to thereby effect the reduction and/or amplification of the buoyant force. As above, a structure may be coupled to the device that retains the device in a fixed relationship to a sea floor, and that restricts movement of the hydrofoil to substantially vertical movement, and/or a generator is actuated at least in part by the substantially vertical movement.

In still further contemplated aspects, a wave energy harvester has a neutral buoyancy body coupled to an amplifier element (e.g., hydrofoil) that is configured such that the element and the body is raised by forward water motion of a wave moving past the harvester, and such that energy is extracted (e.g., using a turbine that is coupled to the neutral buoyancy body) by resisting lowering of the neutral buoyancy body and amplifier element following passage of the wave. Where desirable, the wave energy harvester has neutral buoyancy and is configured such that the entire harvester becomes submerged when a storm churns a water surface to thereby reduce density of the surface. Viewed from another perspective, any wave energy harvester may therefore also have neutral buoyancy, wherein the wave energy harvester is configured such that the harvester becomes submerged when a storm churns a water surface to thereby reduce density of the surface. Preferably, neutral buoyancy is (e.g., dynamically) adjustable from a positive buoyant device to a neutrally buoyant device.

Various objects, features, aspects and advantages of the present invention will become more apparent from the following detailed description of preferred embodiments and the accompanying drawings.

DETAILED DESCRIPTION

The inventors discovered that the forward and backward movement of water during wave movement and the up and down movement of water during wave movement can be extracted in a single device in which a hydrofoil or hull translates the forward and backward movement of water into an increased up and down movement, which can be extracted in numerous known manners. Contemplated configurations and devices may also be employed to stabilize a floating device against the up and down and/or side-to-side buoyant forces of waves, or to increase such motion where desired.

It should be recognized that water molecules at or near the surface of a wave follow a cycloid path when viewed in a cross-sectional profile of a wave. For example, at the top of a wave peak, the water molecules are moving forward at approximately the apparent speed of the wave, while water molecules in the trough of the wave move backwards. At the same time, as the wave peak approaches, the water molecules rise, and as the wave peak recedes, the water molecules fall. Remarkably, heretofore known wave energy harvesters only make use of either the forward motion or the vertical motion, but fail to extract energy from both motions. Here, the inventor contemplates to extract energy from the actual movement of the water molecules at or near the surface in all coordinates (e.g., up- and down movement and forward and backward movement).

Consequently, in one exemplary aspect of the inventive subject matter, a wave energy harvester is contemplated that has an at least partially submersed amplifier element, wherein the element has a shape effective to translate the forward velocity of water of a wave relative to the element into an upward force of the element, and wherein the element is functionally coupled to a generator such that movement of the element actuates the generator.

Figure 1A:
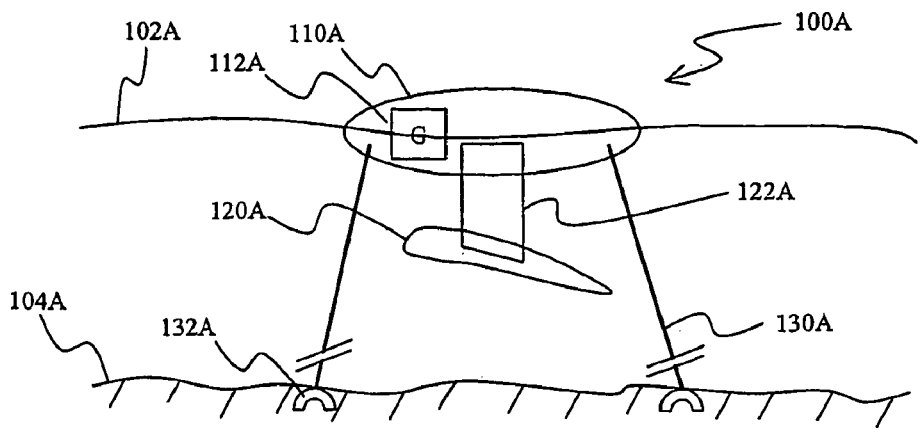
FIG. 1A is a schematic side view of an exemplary wave energy harvester in a body of water between two waves.

For example, FIG. 1A depicts one exemplary waver energy harvester 100A having a body 110A that floats on the water surface 102A, wherein the body is tethered to the seabed 104A via tethers 130A and anchors 132A. Coupled to the body 110A is an amplifier element (here: hydrofoil) 120A using rigid frame 122A. Generator 112A is disposed within the body 110A and is driven by a mechanism that extracts energy from the upward movement of the harvester 100A relative to the seafloor (e.g., via movement of tethers 130 relative to the body 110A, or via hydraulic action of a pump).

Figure 1B:
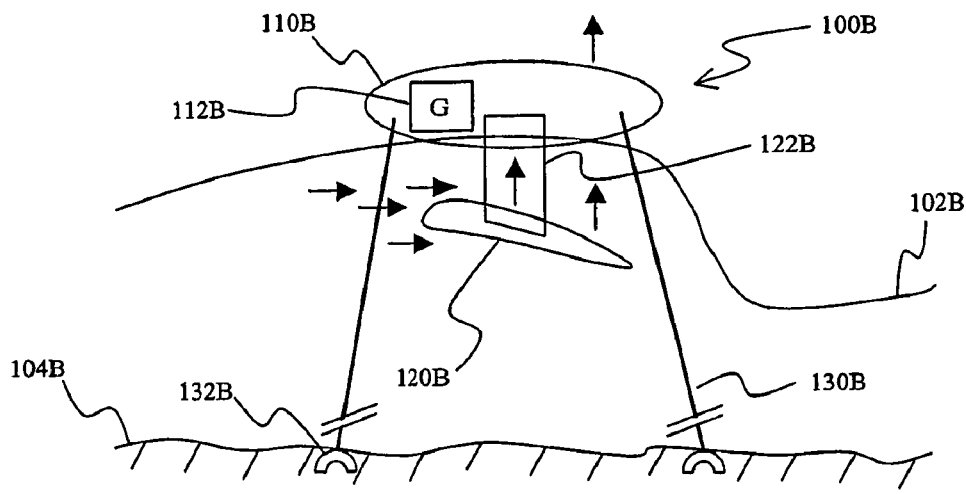
FIG. 1B is a schematic side view of the exemplary wave energy harvester of FIG. 1A at or near the apex of a wave.

When a wave passes the harvester as depicted in FIG. 1B, the forward movement of the water in the wave (illustrated by horizontal arrows pointing to the right) will impinge on and pass the amplifier element 120B and thereby produce lift of the amplifier element. As the amplifier element is rigidly coupled to the body 110B, the entire harvester 100B is lifted by the forward motion of the passing water (illustrated by vertical arrows pointing upwards) and the wave height. Therefore, it should be especially appreciated that the harvester 100B will increase its distance from the seabed 104B in an amount that is the sum of the buoyant lift provided by the increased height in the water column of the wave and the lift produced by the forward movement of the water in the wave.

Figure 1C:
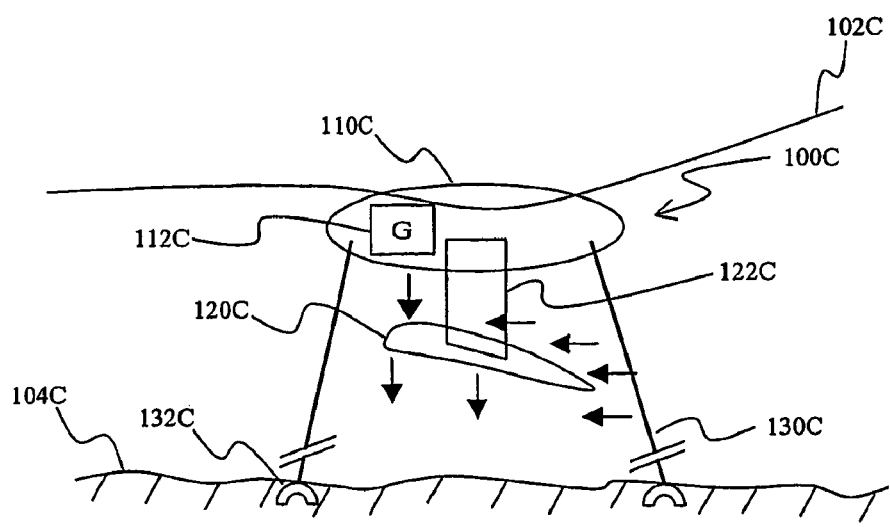
FIG. 1C is a schematic side view of the exemplary wave energy harvester of FIG. 1A at or near the low point of a wave

As the wave peak passes the harvester 100C as depicted in FIG. 1C, the distance between the harvester 100C and the seabed 104C decreases (relative to FIG. 1B), and the backward movement of the water in the wave (illustrated by horizontal arrows pointing to the left) will impinge on and pass the amplifier element 120C in the opposite direction as shown in FIG. 1B to thereby produce a downward force on the amplifier element 120C. Thus, it should be especially appreciated that the harvester 100C will decrease its distance from the seabed 104C in an amount that is the sum of the downward falling movement provided by the decreased height in the water column of the wave and the downward movement produced by the backward movement of the water in the wave. With respect to the remaining numerals in FIGS. 1B and 1C, it is noted out that like numerals denote like components of FIG. 1A.

Thus, it should be appreciated that contemplated devices (and especially floating devices) include a hydrofoil or other amplifier element that is configured to amplify a buoyant force of a wave passing the device. Where desired, it should be recognized that the buoyant force may also be reduced by inverting the orientation of the hydrofoil such that lift is provided upon backward flow of the water and downward movement is provided upon forward flow of the water (relative to the leading edge of the hydrofoil). Viewed from another perspective, it is contemplated that a wave energy harvester has a hydrofoil element that produces a bi-directional force from a horizontal motion of water of a wave, wherein the bi-directional force is directed upwards as the wave approaches a peak and directed downwards as the wave approaches a trough.

With respect to the (typically floating) body, it should be recognized that all known forms, shapes, sizes, and materials are deemed suitable for use herein. However, it is generally preferred that the body is fabricated from a material that is resistant to sea water and prolonged exposure to sunlight. Among other suitable materials, various synthetic polymers, fiberglass, metals, metal alloys, and all reasonable combinations thereof are specifically contemplated herein. Depending on the material, the body may therefore float, be at least partially submersed, or will have a neutral buoyant position on or in the water. With respect to the size, it is generally preferred (but not required) that the smallest dimension is at least one meter. Moreover, suitable bodies may be constructed as a single units, or as a plurality of bodies that may be rigidly and/or flexibly coupled to each other.

An example for contemplated floating bodies is described in U.S. Pat. No. 6,045,339, which is incorporated by reference herein, which are then modified by adding one or more hydrofoils to at least one of the floats. As originally described, the wave harvester of the '339 patent uses three floats attached by arms to a triangular central float. As the arm floats move up and down relative to the central float, the arms actuate pumps to harvest the energy. The power output of the device is determined by the height reached by the floats, which is limited by the height of the waves. As will be readily recognized, hydrofoil elements coupled to the device below the floats, or an angled or planing hull design of the floats, or a combination, would lift the floats higher at the peak of the wave. Therefore the device would harvest more energy on each down stroke. Moreover, in the case of open hydrofoil elements in the water below the floats, the reversed horizontal flow in the trough of the wave would pull the float down below its neutral flotation point, thereby increasing the travel of the pump and harvested energy. Similarly, it is contemplated that one or more floating bodies of the heretofore known wave energy harvesters can be modified to increase the travel distance as described in FIGS. 1A to 1C above.

With respect to the amplifying element, it is generally preferred that the amplifying element has a hydrofoil shape, or is a lifting or planing hull. However, numerous alternative shapes and configurations are also deemed suitable and include angled channels that produce an upward and/or downward water jet from horizontally moving water. As most commonly ocean waves travel at a velocity of about 10 to 40 km per hour, preferred amplifying elements are configured to provide optimum lift and/or downward force at such water velocities (e.g., speeds used to generate lift from hydrofoils or induce planing in speedboats). It should further be recognized that since water has a significantly higher density than air, considerable lifting forces can be generated from relatively small amplifying elements. Moreover, by appropriate design, the same elements can pull the moving element down during the reverse motion of the trough. Thus, by incorporating a lifting shape into the moving element of a wave energy harvester, one can increase the height attained at the peak of the wave and/or depth attained at or near the trough of the wave. Such incorporation may be performed as a retrofit for an already existing wave harvester, or from scratch in a newly built harvester.

It should also be recognized that suitable amplifying elements can be integral with the body, or coupled to the body at any position that allows the amplifying element to increase lift and/or to decrease downward movement using forward and/or backward movement of water in a wave. Moreover, and especially where the amplifying element is coupled to the body by a frame or other rigid structure, it is contemplated that the angle of attack can be changed to accommodate to a particular wave speed or a desired lift.

Furthermore, is should be recognized that the lift generated by the forward motion of a wave will increase the drag on the device in the direction of the wave travel. However, the reverse flow during the trough will counteract such drag by pulling the device back towards the following peak, so overall, hydrofoil additions will not increase the net force on the tether more than the net forward motion of the water elements, which is minor. In contrast, hydrofoil elements will increase drag on a simple bobbing device, which will result in an increased horizontal motion (forward and backward) during a single wave cycle. The drag of hydrofoil elements on devices with multiple floats in various portions of the wave, such as the "wave motor" of the '339 patent above, will be balanced and therefore have only little, if any impact on the forward and backward motion.

Any floating device on the ocean surface will be subject to waves and will therefore rise, fall, and/or tilt, depending on size. In the case of floating platforms, such tilting may be undesirable. Using contemplated configurations and methods presented herein, it should also be appreciated that amplifying elements may be coupled to a floating device that counteract the buoyant force of the waves by generating an opposing force from the forward and backwards movement of the water elements. Conversely, where the tilting motion caused by waves is desirable (e.g., bell buoys) added amplifying elements can be configured to increase the motion caused by the waves. Since the crest of the wave will have the highest horizontal water particle velocity, dampening will generally be coordinated with the vertical motion of the wave. Design criteria for hydrofoils are well understood and attaching a hydrofoil array to a floating device to counteract wave motion (over a range of wave heights) is considered well within the purview of a person of ordinary skill in the art.

Figure 2A:
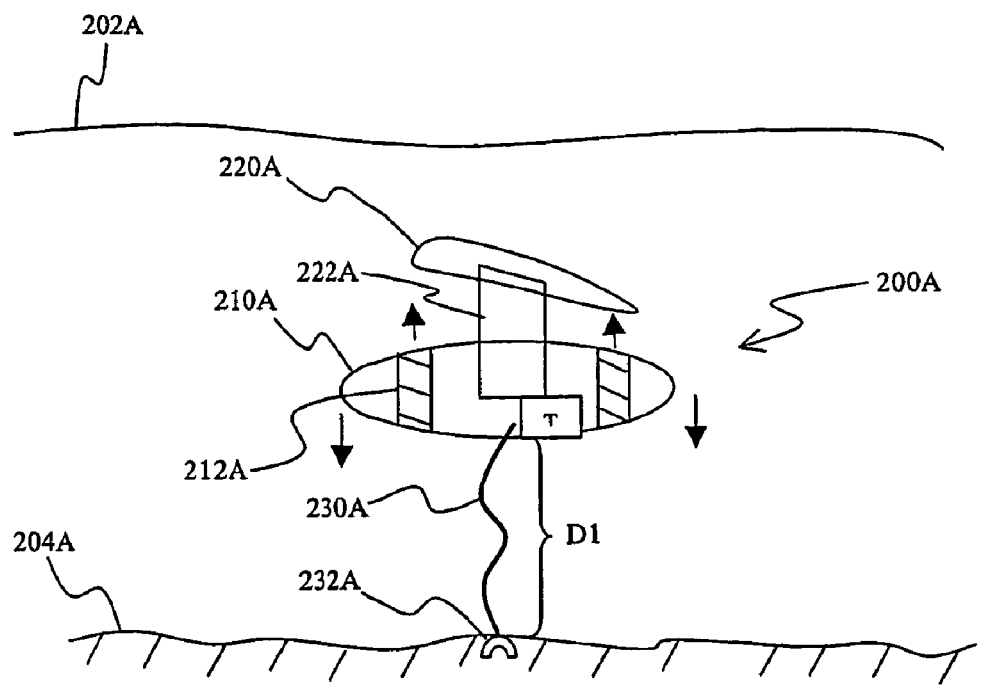
FIG. 2A is a schematic side view of another exemplary wave energy harvester at or near the apex of a wave.

In yet further preferred aspects of the inventive subject matter, it is contemplated that the wave energy harvester need not be limited to those having a buoyant element to achieve power extraction from the wave. In such cases, only forward movement of the water in a wave is used for power generation. For example, a neutrally buoyant body may be suspended at a predetermined depth as depicted in FIG. 2A. Here, the wave energy harvester 200A has a neutrally buoyant body 210A, which is fixedly coupled to hydrofoil 220A via frame 222A. Body 210A rests below the water surface 202A at a depth D1 relative to the seabed 204A. As in the device of FIGS. 1A-1C, the body 210A is tethered to the seabed 204A via tether 230A and anchor 232A. Integral with the body 210 is a turbine 212A that is driven by water flow (typically upwardly) through the body. Tank T may be employed to adjust buoyancy of the device as needed.

Figure 2B:
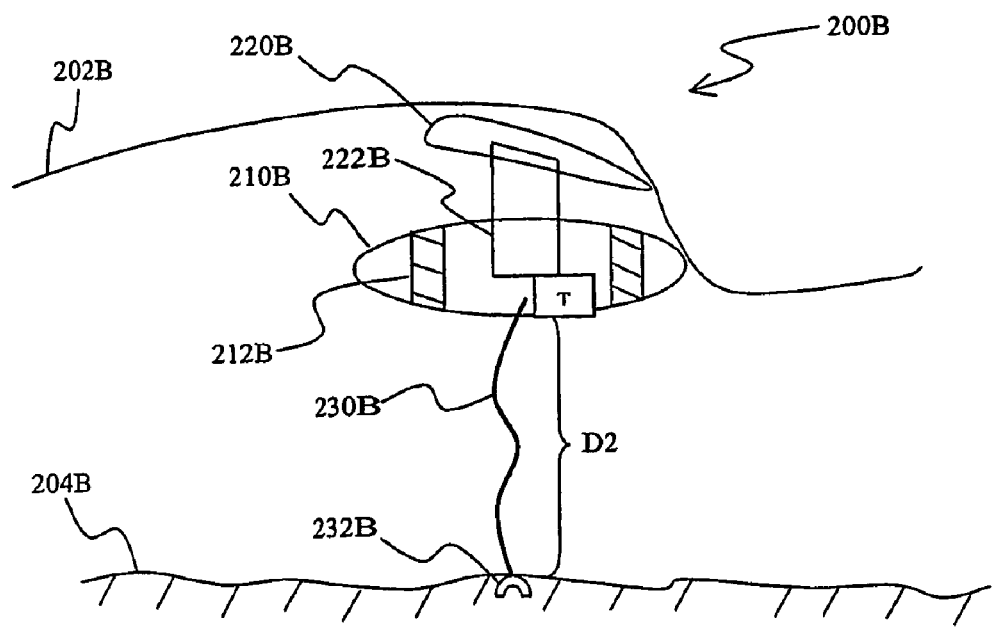
FIG. 2B is a schematic side view of the exemplary wave energy harvester of FIG. 2A in a body of water between two waves.

FIG. 2B depicts the device of FIG. 2A as a wave passes the device. Here, the hydrofoil 220B provides additional lift that is produced from the forward movement of water of the passing wave. The device will be then at a depth D2, wherein the difference between D1 and D2 is predominantly provided by the lift from hydrofoil 220A and the difference in water column. As the wave recedes, the device 200B will sink back to the original neutral buoyant depth (as illustrated by downwards pointing arrows), and kinetic energy is extracted by the turbine 212B via water flow through the body 210B (as illustrated by upwards pointing arrows). With respect to the remaining numerals in FIG. 2B, it is noted out that like numerals denote like components of FIG. 2A. Therefore, it should be recognized that a neutrally buoyant body will rise and fall with the waves, and that rising movement can be amplified by coupling a hydrofoil to the body. The energy of the downward movement of the body to the neutrally buoyant position can then be extracted using all known manners. Thus, a point absorber can be designed with neutral buoyancy that utilizes the forward and/or backward force of the water elements of the waves. Such absorbers do not require submersion below their flotation height to develop a buoyant force. In contrast, the neutrally buoyant weight will be raised by the wave the full height of a water element at its average depth. Additionally, more than one neutrally buoyant devices may be employed that can be coupled together, wherein energy can be extracted from the movement of a single device, and/or movement of one device relative to another device.

An additional advantage of neutral buoyancy is that during a storm, the top layers of the ocean become churned by the breaking waves and therefore the water is filled with bubbles, reducing its density. Any object of neutral buoyancy will sink to the interface with the undisturbed water below this churned layer, and therefore be protected from the extreme motions of the waves at the surface. Therefore, a wave energy harvester that is neutrally buoyant will become submerged during a storm and be protected by a layer of water until the storm passes. Such a neutrally buoyant wave energy harvester can use the horizontal motion of the water to amplify the relative motion of its elements as well as the hydrodynamic forces to harvest wave energy.

Consequently, the inventors contemplate a wave energy harvester comprising a neutral buoyancy body coupled to an amplifier element that is configured such that the element and the body is raised by forward water motion of a wave moving past the harvester, and such that energy is extracted by resisting lowering of the neutral buoyancy body and amplifier element following passage of the wave.

Viewed from a different perspective, it should be appreciated that a wave energy harvester may have neutral buoyancy, and that the wave energy harvester is configured such that the harvester becomes submerged when a storm churns a water surface to thereby reduce density of the surface. Of course, the neutral or negative buoyancy can be achieved in numerous manners, and it is especially preferred that in some aspects the neutral or negative buoyancy is a constant property of the harvester, while in other aspects the buoyancy can be adjusted. Where the buoyancy is adjusted (e.g., from a positive buoyancy to a neutral or negative buoyancy), it is especially preferred that the adjustment is dynamically and at least in part dependent on wave and/or weather conditions. For example, where a storm increases wave motion above a predetermined level, a positively buoyant harvester may be temporarily adjusted to a neutrally buoyant harvester that sinks to a level underwater that reduces or entirely eliminates damage to the harvester.

Buoyancy can be modified using numerous manners well known in the art, and all of the known manners are deemed suitable for use herein. For example, a wave energy harvester may include one or more tanks that can be flooded or evacuated (e.g., via drain valve, pump, and/or compressed air), wherein the flooding and/or evacuation is controlled by a dynamically adjustable circuit that is sensitive to wave movement, input of a wave sensor proximal to the harvester, or an accelerometer in the harvester. While adjustable buoyancy is generally contemplated for all known wave energy harvesters, it is especially preferred that such wave energy harvesters include one or more hydrofoils.

With respect to energy extraction in all of contemplated devices, it should generally be recognized that all known mechanisms of energy generation in wave energy harvesters are deemed suitable herein. For example, the increase and/or decrease of relative height between the device and seabed can be extracted using a tether that is fixedly coupled to the seabed, and movably coupled the device (e.g., via a rotating and/or reciprocating element that actuates an electrical generator). Most commonly, vertical movement of the harvester is translated into a movement of a static portion relative to a moving portion in the harvester (e.g., linear, reciprocating, and/or rotational) to thereby actuate an electric generator. Alternatively, energy may also be extracted from angular movement of one portion of the harvester relative to another portion in manners well known to the art. Additionally, or alternatively, the device may include or be coupled to one or more turbines that are driven by the vertical flow of water relative to the device. It should further be appreciated that while electric generation is especially preferred, alternative generators may also include pumps, and particularly sea water pumps. For example, sea water may be pumped to an aquaculture operation, or to a desalination device or plant.

Thus, specific embodiments and applications of energy extraction of waves have been disclosed. It should be apparent, however, to those skilled in the art that various modifications besides those already described are possible without departing from the inventive concepts herein. The inventive subject matter, therefore, is not to be restricted except in the spirit of the present disclosure. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A wave energy harvester comprising:
   an at least partially submersed amplifier element, wherein the element is rigidly coupled to a generator such that at least a portion of vertical movement of the element actuates the generator;
   wherein the amplifier element has a shape and has a fixed angle of attack throughout a wave cycle of a passing wave such that
   (a) the amplifier element is effective to translate forward velocity of water of a cresting wave relative to the element into an additional upward force of the entire wave energy harvester as compared to an upward force without the amplifier element, and such that
   (b) the amplifier element is effective to translate backward velocity of water of a wave approaching its trough relative to the element into an additional downward force of the entire wave energy harvester as compared to a downward force without the amplifier element; wherein the shape of the amplifier element has a hydrofoil shape or a lifting or planing hull shape.

2. The wave energy harvester of claim 1 wherein the amplifier element has a neutral buoyancy.

3. The wave energy harvester of claim 1 wherein the generator comprises an electric generator.

4. The wave energy harvester of claim 1 further comprising a structure that retains the harvester in a laterally fixed position relative to a sea floor, and that allows vertical movement of the amplifier element relative to the sea floor.

5. A wave energy harvester comprising a hydrofoil element that is rigidly coupled to the harvester to allow maintaining of a fixed angle of attack throughout a wave cycle of a passing wave such that the hydrofoil element produces a supplementary bi-directional vertical force from a horizontal motion of water of a wave relative to the harvester, wherein the bi-directional force is directed upwards as the wave approaches a peak and directed downwards as the wave approaches a trough.

6. The wave energy harvester of claim 5 wherein the hydrofoil element is completely submersed.

7. The wave energy harvester of claim 5 wherein the hydrofoil element is coupled to a buoyant element that is at least partially submersed.

8. The wave energy harvester of claim 5 further comprising a generator that is actuated using at least part of the bi-directional force.

9. The wave energy harvester of claim 5 further comprising a structure that retains the harvester in a fixed relationship to a sea floor, and that further restricts movement of the hydrofoil element to substantially vertical movement.

10. A wave energy harvester comprising a hydrofoil that is rigidly coupled to the harvester such as to allow maintaining of a fixed angle of attack throughout a wave cycle of a passing wave and that is positioned on the harvester to amplify and optionally reduce a buoyant force of a wave passing the harvester, wherein the hydrofoil is positioned such that lift generated by a forward motion of the wave increases drag on the harvester in direction of the wave travel.

11. The wave energy harvester of claim 10 comprising a frame to which the hydrofoil is coupled and that is configured to allow change of a pitch angle of the hydrofoil relative to a plane normal to a direction of the wave to thereby effect at least one of reduction and amplification of the buoyant force.

12. The wave energy harvester of claim 10 further comprising a structure that retains the harvester in a fixed relationship to a sea floor, and that further restricts movement of the hydrofoil to substantially vertical movement.

13. The wave energy harvester of claim 12 further comprising a generator that is actuated at least in part by the substantially vertical movement.

14. A wave energy harvester comprising a neutral buoyancy body rigidly coupled to an amplifier element to allow maintaining of a fixed angle of attack throughout a wave cycle of a passing wave, wherein the amplified element is arranged such that the element and the body are additionally raised by forward water motion of a cresting wave moving past the harvester as compared to a harvester without the amplified element, wherein the shape of the amplifier element has a hydrofoil shape or a lifting or planing hull shape.

15. The wave energy harvester of claim 14 wherein the energy is extracted using a turbine that is coupled to the neutral buoyancy body.

16. The wave energy harvester of claim 14 wherein the entire wave energy harvester has neutral buoyancy during normal operation and is configured such that the harvester becomes submerged when a storm churns a water surface to thereby reduce density of the surface.

* * * * *